United States Patent

[11] 3,582,756

| [72] | Inventor | William McMurray<br>Schenectady, N.Y. |
|---|---|---|
| [21] | Appl. No. | 010,804 |
| [22] | Filed | Feb. 12, 1970 |
| [45] | Patented | June 1, 1971 |
| [73] | Assignee | General Electric Company |

[54] POLYPHASE POWER CONVERTER CIRCUITS HAVING A HIGH FREQUENCY TRANSFORMER LINK
19 Claims, 11 Drawing Figs.

[52] U.S. Cl. .................................................. 321/5,
321/7, 321/10, 321/66, 329/50, 330/10
[51] Int. Cl. .................................................. H02m 5/16,
H02m 1/14, H03d 3/18
[50] Field of Search .......................................... 321/1, 5, 7,
10, 43, 47, 57—59, 60, 66; 330/10; 329/50

[56] References Cited
UNITED STATES PATENTS
3,321,693  5/1967  Heinrich et al. .............. 321/5

| 3,487,289 | 12/1969 | McMurray | 321/60X |
| 3,517,300 | 6/1970 | McMurray | 330/10 |

Primary Examiner—William H. Beha, Jr.
Attorneys—John F. Ahern, Paul A. Frank, Julius J. Zaskalicky, Frank L. Neuhauser, Oscar B. Waddell and Joseph B. Forman ABSTRACT: A polyphase switching circuit employing bidirectional conducting solid state devices (such as series capacitor commutated inverse-parallel connected SCRs) each in series with one winding of a single phase high frequency transformer are switched in sequence at a high switching rate as compared to the low frequency polyphase supply to time share the transformer link among the phases. On the secondary side of the transformer is a similar polyphase switching circuit or a single phase rectifier comprising switching devices in series with the other winding that are switched synchronously with those on the primary side. With the aid of output filter capacitance, the reformed output voltage is a polyphase voltage with the same low frequency or a unidirectional voltage of one or either polarity.

PATENTED JUN 1 1971
3,582,756
SHEET 1 OF 5
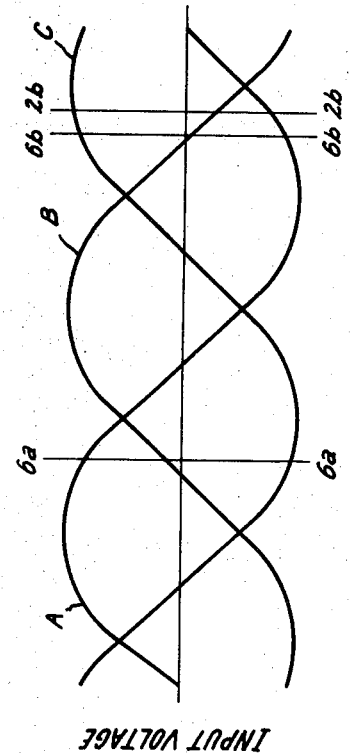
Fig. 2a.
INPUT VOLTAGE
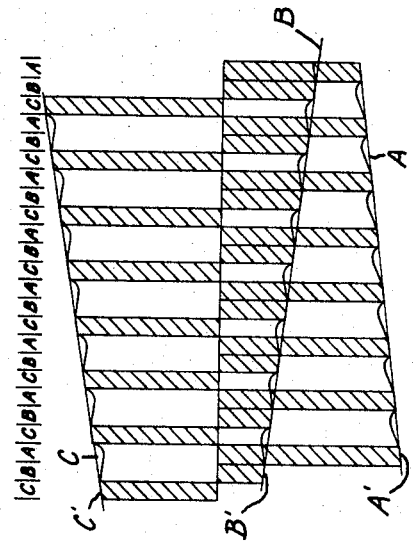
Fig. 2b.
TRANSFORMER AND OUTPUT VOLTAGE
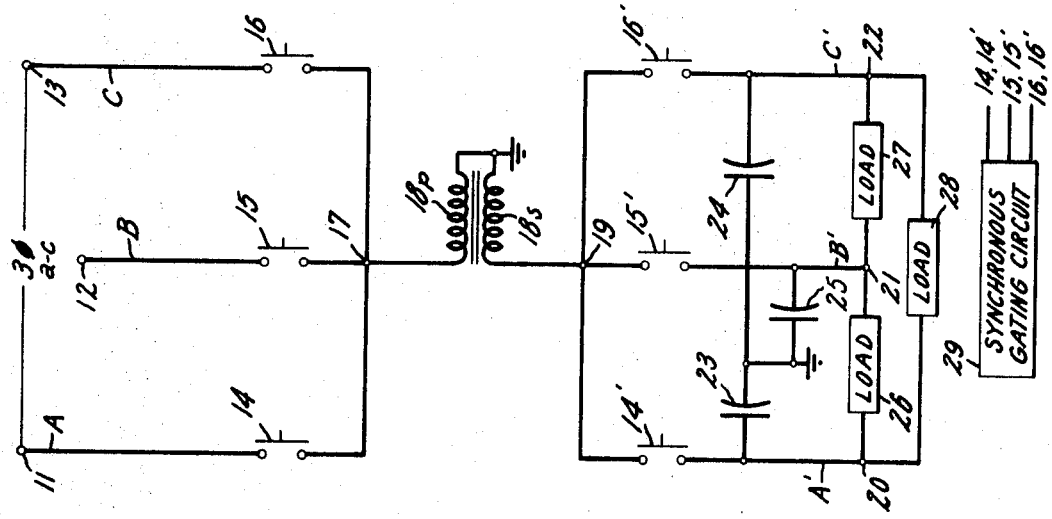
Fig. 1.
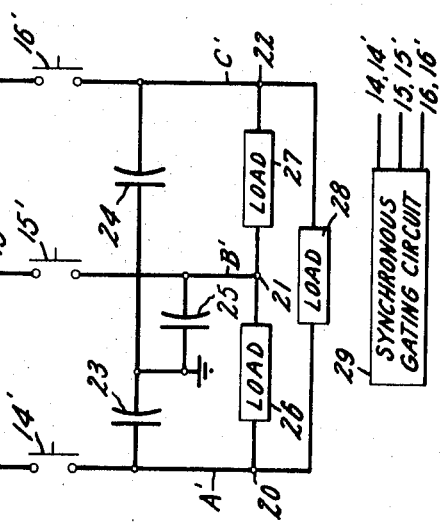
Inventor:
William McMurray,
by Donald R. Campbell
His Attorney.

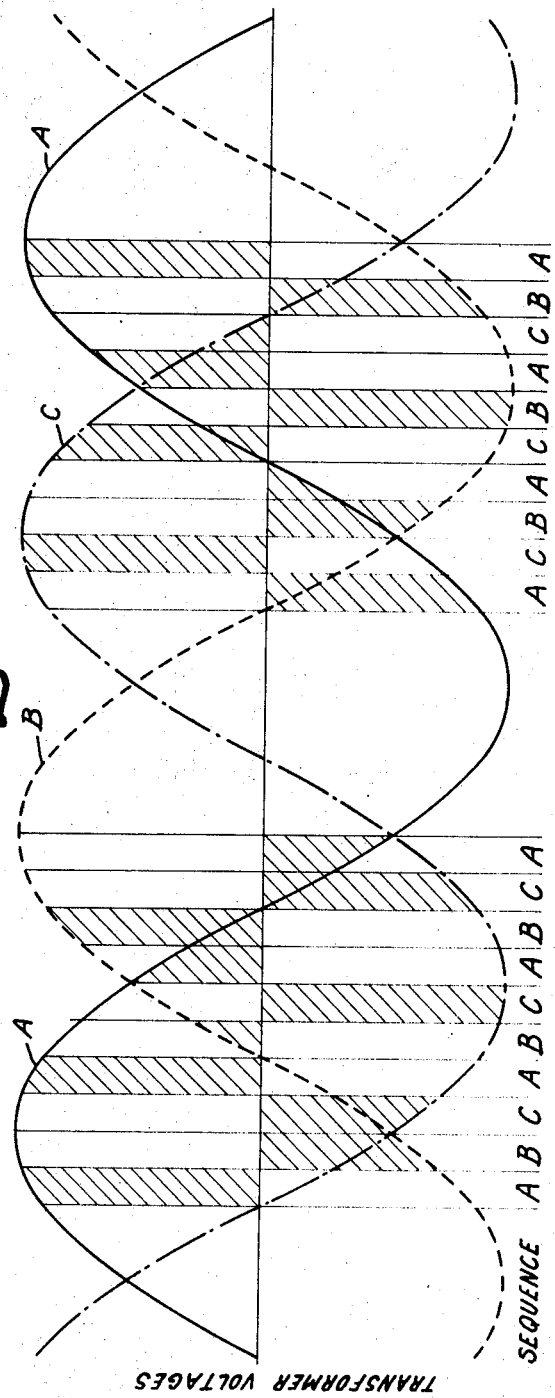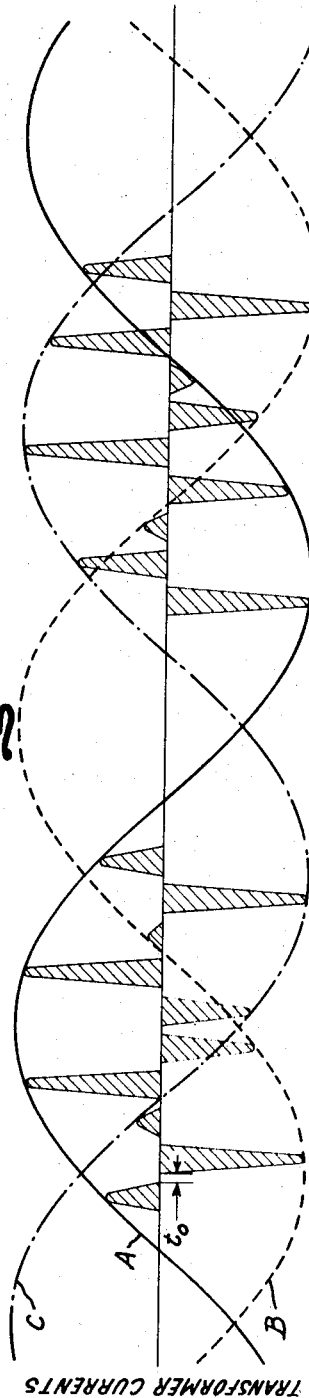
Fig. 4a.
Fig. 4b.
Inventor:
William McMurray,
by Donald R. Campbell
His Attorney.

Inventor:
William McMurray,
by Donald R. Campbell
His Attorney.

Inventor:
William McMurray,
by Donald R. Campbell
His Attorney.

POLYPHASE POWER CONVERTER CIRCUITS HAVING A HIGH FREQUENCY TRANSFORMER LINK

This invention relates to polyphase power converter circuits employing solid-state switching devices, and more particularly to polyphase converter circuits having a single phase high frequency coupling transformer that is time shared among the low frequency supply phases by suitable operation of the switching devices. The converter circuit operates as an electronic transformer to produce transformed polyphase output potentials having the same low frequency as the input, or as a rectifier to produce transformed unidirectional potentials of either polarity.

Generally related single phase power converter circuits with a high frequency transformer link are described in copending applications Ser. No. 721,643 by Jerry L. Stratton, filed Apr. 16, 1968 and Ser. No. 721,817 by William McMurray, filed on the same date. The first of these applications discloses and claims the broad concept of this type of power converter circuit with a single phase alternating current input and output, while the second is directed to such circuits employing switching devices such as transistors or gate turnoff semiconductors that are rendered nonconductive by a control electrode signal. These single phase power converter circuits comprise basically one or two pairs of solid-state switches connected to the windings at each side of a high frequency linear coupling transformer. The switches on the primary side of the transformer are rendered conductive alternately at a high frequency rate in inverter fashion to convert the low frequency supply voltage to a high frequency wave applied to the coupling transformer. On the secondary side the switches are operated similarly in synchronism at the same high frequency rate to reconstruct the original supply waveform with the same frequency at the desired voltage level. The supply voltage can be either a low frequency alternating current voltage (for example, less than 400 Hz.) or a direct current voltages, since the high frequency link is operated at a sufficiently high frequency (for example, 10 kHz. that in either case the supply appears to the solid state switches as a direct current voltage. The converter circuit is relatively simple and because of the high frequency link achieves a considerable reduction in the size of the transformer required for the voltage transformation and voltage isolation functions. Moreover, the switches can be controlled to obtain other essential and desirable power circuit features such as current limiting and current interruption. When bidirectional conducting switches or an equivalent inverse-parallel pair of unidirectional conducting switches are used, as are required for an alternating current supply or either polarity direct current supply, the same sequence of switching is used for both resistive and reactive loads and also for the case of a regenerative load where power flow is in the other direction. The circuit is thus versatile in application.

U.S. Pat. No. 3,487,289 to William McMurray, granted Dec. 30, 1969 and assigned to the same assignee as this invention, is directed to the version of these single phase power converter circuits with a high frequency coupling transformer employing series capacitor commutated thyristors or other solid-state switching devices. The implementation of these new power converter circuits with thyristor-type switching devices initially presented a problem as to the form of commutation circuit suitable for incorporation in the power circuit. This is in contrast to devices such as the transistor and gate turnoff device which can can be easily turned off or rendered nonconductive without regard to the power circuit voltage and current by applying or removing a control electrode signal. Both the turn-on and turnoff control circuitry can then be a part of a separate control circuit. Thyristors such as the silicon controlled rectifier are easily switched from a blocking to a conducting condition, but are difficult to commutate off or return to the blocking condition because of the necessity of reducing the current through the device to zero and applying a reverse voltage for a short period of time greater than the turnoff period required by the device. The thyristor commutation circuits are an integral part of the power circuit and usually include one or more commutating capacitors for storage of energy. The ability of a commutating capacitor to generate a reverse current flow to reduce the current through a thyristor device to zero is proportional to the voltage to which the capacitor is charged prior to the initiation of commutation. It will be recalled that the solid-state switches in the power converter circuit function in inverter fashion, and in most inverter circuits the commutating capacitor voltage is proportional to the supply voltage so that commutation of high currents when the supply voltage is low is difficult. This situation occurs when a low power factor load is supplied from an alternating current source; the current is close to its maximum when the line voltage is passing through zero. As the solution to this problem, it was found that a form of series capacitor commutation in this circuit is unexpectedly different from that in the ordinary series capacitor commutated inverter in that the magnitude of the current pulses and the peak value of the commutating capacitor voltage are proportional to the load current alone under steady state conditions. Further, by using a large capacitive output filter connected across the single phase output terminals, the current pulse duration remains substantially constant at one-half the natural period of the series L-C commutating circuit and is thereby independent of the load impedance.

The present invention involves an extension of the principles of these single phase power converter circuits, and relates to circuits designed especially to be energized by a polyphase alternating current source. Although three of the single phase converters can be connected to a three-phase source, each phase still operates as a single phase converter circuit and is independent of the action of the other two phases.

Accordingly, an object of the invention is to provide relatively simple polyphase power converter circuits employing a single phase high frequency coupling transformer in configurations to produce a rectified output or a three-phase output with the same low frequency as the input.

Another object is the provision of such solid-state polyphase power converter circuits wherein the switching devices are operated to time share a single high frequency transformer link among the input phases.

Yet another object is to provide a new polyphase rectifier with a single phase high frequency link capable of generating a transformed output.

In accordance with the invention, a polyphase power converter circuit comprises a single phase high frequency linear coupling transformer, a first polyphase switching circuit including in each phase solid state switching means effectively connected in series circuit relationship between one of the transformer windings and one of a set of first terminals in which appears a polyphase low frequency electric potential, and a second switching circuit including a plurality of solid-state switching means each effectively connected in series circuit relationship with the other transformer winding and at least one of a set of second terminals. The power converter circuit further includes control means for synchronously rendering conductive at least one of the solid-state switching means in each switching circuit for a predetermined interval of conduction, and for sequentially rendering conductive at least one of the other solid-state switching means in each switching circuit synchronously for a predetermined interval of conduction. The switching circuits are switched continuously at a switching rate which is relatively high as compared to the frequency of the polyphase low frequency electric potential. The usual mode of switching is to rotate among the input phases in the same phase sequence as the low frequency polyphase electric potential, or in the counter phase sequence.

In one embodiment that produces polyphase output potentials with the same low frequency as the input, the second switching circuit is also a polyphase circuit and all the solid-state switching means have bidirectional conducting characteristics. In another embodiment for producing unidirectional output potentials of one or both polarities, the second switching circuit is a single phase rectifier implemented with either unidirectional devices such as diodes or with bidirectional conducting switching means. Thyristor versions of the circuits employing inverse-parallel pairs of silicon controlled rectifiers are disclosed with a suitable form of series capacitor commutation. The foregoing and other objects, features, and advantages of the invention will be apparent from the following more particular description of several preferred embodiments of the invention as illustrated in the accompanying drawings wherein:

FIG. 1 is a schematic circuit diagram of a simplified polyphase power converter circuit constructed in accordance with the invention in a three-phase electronic transformer configuration that functions to convert a three-phase input to a corresponding transformed three-phase output with the same frequency as the input;

FIG. 2a is a wave form diagram showing the three-phase alternating current supply voltage for the circuit of FIG. 1;

FIG. 2b is a transformer voltage waveform diagram to a greatly enlarged scale illustrating the time sharing of the three phases by the single phase coupling transformer; also superimposed on this diagram are the correspondingly enlarged output voltage waveforms;

FIGS. 4a and 4b are characteristic transformer voltage and current waveforms, respectively, for the FIG. 3 circuit for two different sequences of thyristor firing;

Figure 5:
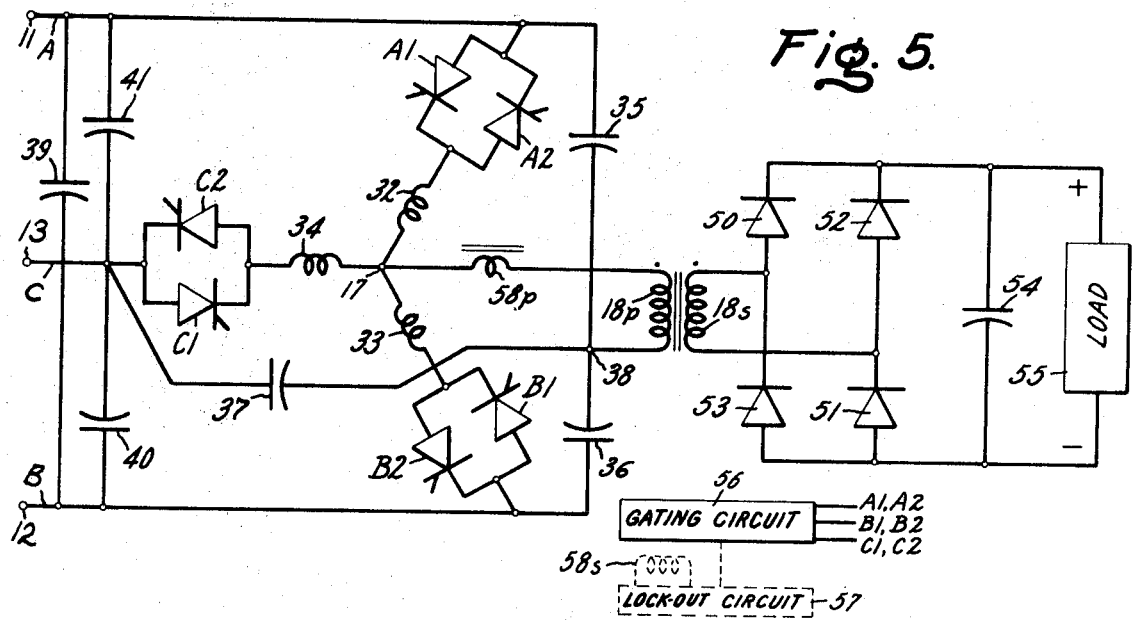
FIG. 5 is a detailed circuit diagram of another embodiment of the invention for producing a rectified output voltage from a three-phase supply voltage that also employs series capacitor commutated thyristors as the switching devices.
Figure 7:
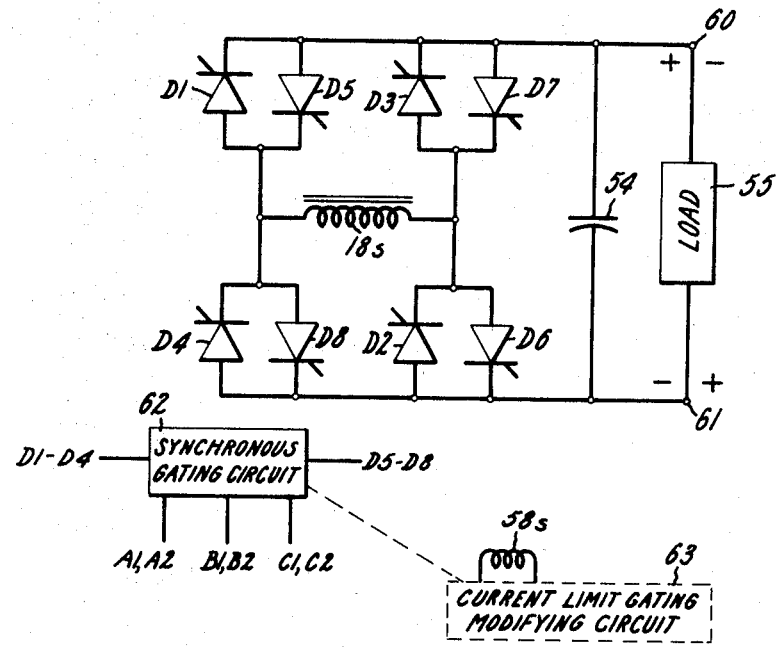
Figure 8:
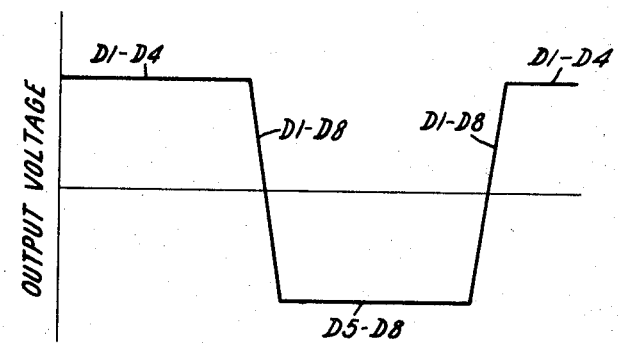

FIG. 7 is a schematic circuit diagram of a modification of the output side of the FIG. 5 circuit showing the substitution of inverse-parallel pairs of thyristors for diodes in order to obtain a rectified output voltage of either polarity; and FIG. 8 is the output voltage wave form diagram obtained when the modified rectifier circuit of FIG. 7 is operated to produce a square wave alternating output. The principles of the polyphase power converter circuits with a single phase high frequency transformer link to be discussed are applicable to multiphase power circuits in general, but will be described primarily with respect to the commonly occuring three-phase alternating current circuit. FIG. 1 is a simplified circuit in diagrammatic form illustrating the new polyphase power converter circuit in a configuration that converts a low frequency three-phase supply to a corresponding three-phase output voltage with approximately the same wave shape and the same low frequency but at a desired transformed output voltage. Analogous to the terminology of the single phase power converter circuit with a high frequency coupling transformer discussed in the aforementioned patent applications as the single phase electronic transformer, this circuit can be referred to as the polyphase electronic transformer. Input terminals 11—13 are connected to a low frequency, three-phase alternating current source typically having a frequency in the range of 50–400 Hz. Three bidirectional conducting switches 14—16, one for each phase, are wye-connected between the input terminals 11—13 and a common point 17. Switches 14—16 are solid-state switches, but for the sake of clarity are represented here as simple mechanical switches. To complete the primary side switching circuit, the primary winding 18p of a single phase high frequency linear coupling transformer is connected between the common point 17 of the switches 14—16 and ground, which is the neutral point of the three-phase supply system.

On the secondary side, the secondary winding 18s of the high frequency linear coupling transformer is connected between ground, which is also the neutral point of the three-phase load system, and the common point 19 of three additional wye-connected bidirectional conducting switches 14', 15', and 16' connected respectively between common point 19 and the three output terminals 20—22. Although illustrated here for simplicity of discussion as having a unity turns ratio, the high frequency coupling transformer has the turns ratio required to secure the selected voltage transformation. Filter capacitors 23—25 are wye-connected between output terminals 20—22 and ground to provide a "stiff" voltage sink for the circuit. The filter capacitors can also be delta-connected. A three-phase resistive or reactive load comprising loads 26—28 is also connected between output terminals 20—22, and the output filter capacitors may not be required if the load has sufficient capacitance. While not required for some sources, in most working circuits a "stiff" voltage source is assured by connecting filter capacitors between the input terminals 11—13.

Synchronous gating circuit 29 is operated to simultaneously close the switches in each phase, on both the primary and secondary sides, for a predetermined interval of time, the switches in the three phases being closed in sequence. Thus, switches 14 and 14' are closed and then opened simultaneously to establish a path between the primary and secondary sides, A and A' of that phase. In sequence, switches 15 and 15' are closed simultaneously for the same interval of time to energize lines B and B', and then switches 16 and 16' to provide a path for current in lines C and C'. To obtain the countersequence CBA the pairs of switches are of course closed in the reverse order. The frequency of closing the switches in each phase is high as compared to the frequency of the three-phase alternating current source, so that the source appears to the switches during the short interval that they are closed as a direct current voltage. The single phase high frequency coupling transformer 18p, 18s, accordingly time shares the three phases, and with the aid of filter capacitors 23—25, the three-phase alternating current input potential is reproduced at output terminal 20—22 with the desired voltage transformation for application to the load. To aid in understanding this, FIG. 2a shows the low frequency, three-phase alternating current input voltages for lines A, B, and C, while FIG. 2 b illustrates to a greatly enlarged scale the voltages appearing in the high frequency coupling transformer when the input voltages have approximately the magnitudes shown at line 2b—2b in FIG. 2a. On this scale, the input voltages for lines A, B, and C appear as inclined straight lines, while at a still higher switching frequency, the input voltages appear to the switches as essentially direct current voltages, i.e., as horizontal straight lines. The transformer voltages for the switching sequence CBA are illustrated and show the time sharing of the high frequency coupling transformer among the three phases as the closing of the pairs of switches in sequence generates voltage segments or pulses that rotate among the three phases. The output voltages appearing on lines C', B', and A' are superimposed on this diagram and have a high frequency ripple due to the fact that the filter capacitors are supplying current to the load in each phase during the time that the switch in that phase is open. The input and output voltages are close in magnitude and phase when the loads draw low current, but the output voltages are reduced in magnitude and displaced in phase from the inputs when the load requires more current. This can be attributed to an equivalent impedance introduced by the electronic transformer, which is analogous to the winding resistance and leakage reactance of an ordinary transformer.

Figure 3:
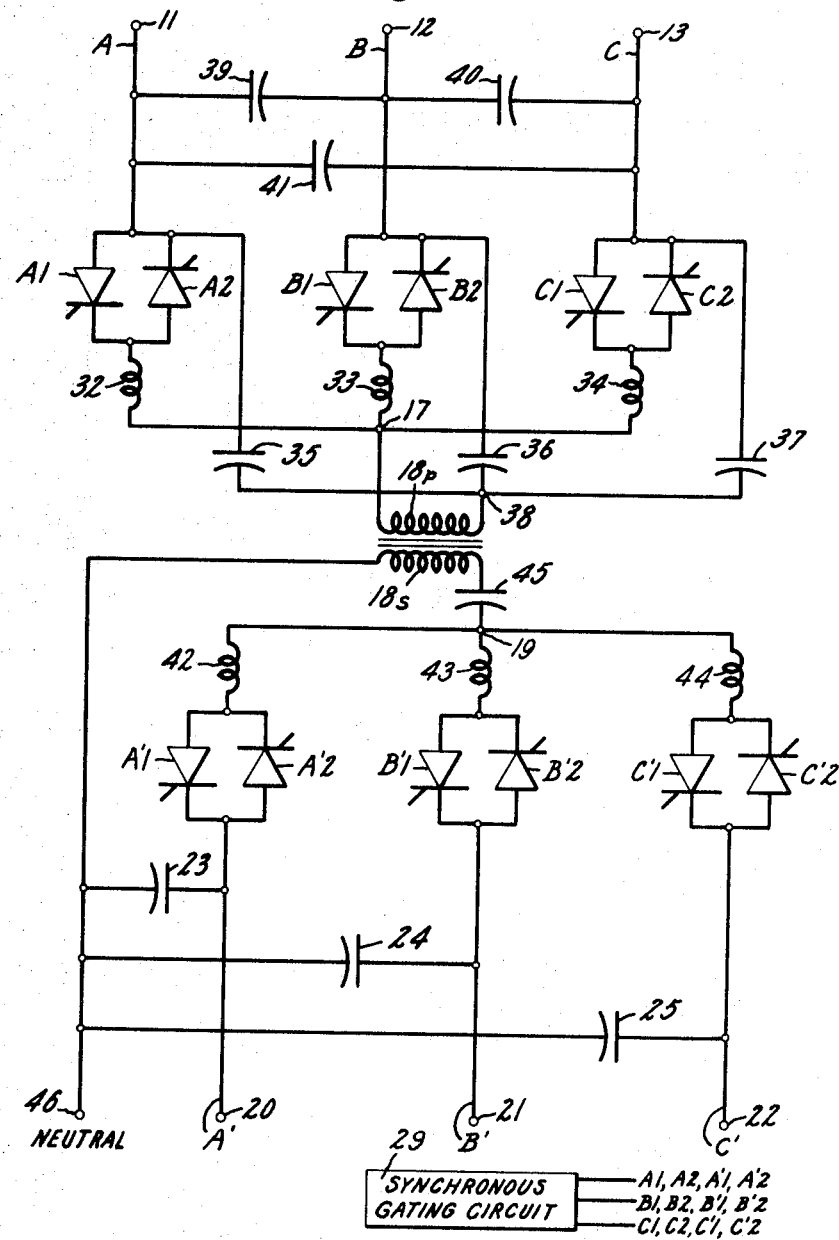
FIG. 3 is a detailed circuit diagram of a preferred embodiment of the invention following the diagram of FIG. 1 and employing series capacitor commutated thyristors as the solid state switching devices.

A variety of solid-state switches can be used to implement the basic polyphase electronic transformer circuit shown in FIG. 1. In order to deal with alternating current potentials, switches 14—16 and 14'—16' must have bidirectional conducting characteristics, and can be, for example, bidirectional conducting thyristors such as the triac or diac, or a pair of unidirectional conducting thyristors such as the silicon controlled rectifier connected in inverse-parallel. It is also possible to use controlled turnoff switches such as the transistor and the gate turnoff silicon controlled rectifier which are rendered nonconductive by control of the signal applied to a control electrode, although these devices at present have lower current carrying capability. These devices can be connected in inverse-parallel with associated blocking diodes as needed, or a single device such as a transistor can be connected in a diode bridge. When solid-state thyristor switching devices are employed, it is necessary in order to have an economical circuit to incorporate the commutation circuits for the thyristors in the power circuit. A practical polyphase electronic transformer circuit implemented with inverse-parallel pairs of silicon controlled rectifiers and series capacitor commutation circuits is illustrated in FIG. 3. These commutation circuits have also been found to be helpful in turning off controlled turnoff devices such as transistors.

In FIG. 3, the single switches 14—16 of FIG. 1 are replaced by inverse-parallel connected pairs of silicon controlled rectifiers A1, A2 and B1, B2, and C1, C2. As in FIG. 1, the three complementary pairs of thyristors are wye-connected, and the circuit further includes commutating inductors 32—34, each connected in series with one of the thyristor pairs between one of the input terminals 11—13 and the common point 17. Commutating capacitors 35—37 are wye-connected between input terminals 11—13 and opposite terminal 38 of the primary winding 18p of the single phase high frequency coupling transformer. With this circuit arrangement, turning on any one of the inverse-parallel pairs of thyristors places the commutating inductor associated with that pair in series circuit relationship with primary transformer winding 18p and wye-connected commutating capacitors 35—37. As will be explained later, the resonant frequency of the series resonant circuit that is energized depends on the value of the commutating inductors and capacitors, if any, on the secondary side of the circuit as well. To provide a "stiff" voltage source, that is, a source having low impedance at the frequency of switching operation, input filter capacitors 39—41 are delta-connected between input terminal 11—13.

On the secondary side of the circuit, the three complementary pairs of thyristors A'1, A'2, and B'1, B'2, and C'1, and C'2 are each connected in series circuit relationship with one of the commutating inductors 42—44, and the series circuits so formed are wye-connected between the common point 19 and the output terminals 20—22. The remainder of the circuit illustrates some of the options that can be taken as to connecting the commutating capacitors and the filter capacitors. A single series commutating capacitor 45 is provided for all of the phases, and is connected between point 19 and one terminal of the secondary winding 18s of the high frequency coupling transformer. If desired, commutating capacitor 45 can be replaced by a short circuit since the primary and secondary side switching circuits need not be symmetrical and all of the commutating capacitance can be placed in one of the circuits. The other terminal of secondary transformer winding 18s is coupled to a neutral terminal 46, and output filter capacitors 23—25 are connected respectively line-to-neutral between this neutral terminal and the output terminals 20—22. The primary and secondary side circuits can be identical, or can be different as here illustrated. In any case, the input and output filter capacitors are a magnitude larger than the commutating capacitors in order that there be a "stiff" voltage source and that the duration of the commutating half sinusoidal current pulses be independent of the load impedance.

The basic operation is the same as that of the already described FIG. 1 embodiment in that all the switches in one phase are turned on simultaneously, and the switches in the other phases are turned on in sequence at a high frequency switching rate to time share the single phase high frequency coupling transformer. Upon turning on thyristors A1, A2 and A'1, A'2 the equivalent series resonant commutation circuit that is energized has a total equivalent commutating capacitance determined by commutating capacitors 35—37 (each C1) in series with commutating capacitor 45 (C2). Assuming a unity transformer turns ratio, the total equivalent commutating capacitance is $$C_{eff} = \frac{3C1 \cdot C2}{3C1 + C2}$$

In the same manner, the total equivalent commutating inductance comprises commutating inductor 32 (L1) in series with commutating inductor 42 (L2). Thus, $L_{eff}=L1+L2$. The half sinusoidal current pulse duration in the equivalent series resonant circuit is $$\pi \sqrt{C_{eff} L_{eff}} \text{ seconds.}$$

Commutation of the conducting thyristors occurs after the half sinusoidal current pulse has ended, when the current in the circuit attempts to reverse and the commutating capacitors are charged to reverse bias the thyristors, which cease to conduct and fully recover following a short interval of time known as the turnoff period $t_o$. Only two of the four thyristors in any one phase of the circuit are conducting at one time, and the option is available of supplying gating signals to only those two thyristors rather than all four as previously explained. Suitable gating circuits that can be employed for the synchronous gating circuits 29 are given, for example, in the Silicon Controlled Rectifier Manual, 4th Edition, copyright 1967, published by the General Electric Company and available by writing to the Semiconductor Products Department, Electronics Park, Syracuse, N. Y. This series capacitor commutation technique is the same as is used in the thyristor version of the single phase power converter circuits described in the aforementioned U.S. Pat. No. 3,487,289, to which reference may be made for further details of operation and characteristics of the commutation circuit. For the reasons given here, this commutating circuit operates differently from that in the ordinary series capacitor commutated inverter in that the magnitude of the current pulses and the peak value of the commutating capacitor voltage are proportional to the load current alone under steady state conditions, rather than being proportional to the supply voltage as well as the load current as in the usual series capacitor commutated circuit. Because the amount of commutating energy which is available is proportional to the instantaneous load current, there is no problem in commutating the thyristors when the load is a reactive load and the current is heavy when the supply voltage is going through zero. The circuit operates to equalize the primary side and secondary side voltages, except for a small difference which is proportional to the load current, and indeed it is this difference in voltages that allows the commutating circuit to operate.

The internal transformer voltages and currents that are produced by operation of the FIG. 3 polyphase circuit are given in FIGS. 4a and 4b for two different thyristor firing sequences, namely, the sequence ABC and the sequence ACB. The case of a lagging power factor load is illustrated, so that the transformer currents lag the instantaneous transformer voltages. As can be observed in FIG. 4b all of the internal currents are half sine waves, and these are separated by intervals at least as great as the turnoff period $t_0$ for the thyristors. The series resonant commutation circuit is tuned to a resonant frequency greater than the switching rate of the solid-state switches to allow for the turnoff period. Regardless as to the phase energization sequence, whether the same as the supply voltage rotation or different from the supply voltage rotation, the single phase high frequency transformer is time shared by the three phases and the output filter capacitors smooth the output voltage applied to the load. The direction of phase displacement of the output voltage for the same load depends upon the thyristor firing sequence, however, since there is a lagging phase shift for the sequence ABC, and a leading phase shift for the sequence ACB, where the low frequency phase rotation is ABC. It is also possible to reverse the phase rotation for the output relative to the input by changing the groups of thyristors on the primary and secondary sides which are gated synchronously. For example, the thyristors in lines A and A' can conduct synchronously, then the thyristors in lines B and C', then lines C and B'. Since this change in the selection of synchronously gated groups of thyristors can be obtained by means of low power logic signals in the gating circuit 29, the direction of rotation of a polyphase motor load can be reversed without the need for high power contactors in the leads to the motor.

The operation of synchronous gating circuit 29 is the same for either a resistive or a reactive load. Once having determined the desired direction of phase rotation and the groups of thyristors that are to be fired synchronously, the operation of the circuit is the same regardless as to the type of load. Depending on circuit conditions, power flow can be from the primary to the secondary side or from the secondary side to the primary side. The load can also be a regenerative-type load that feeds power into the supply lines. Regardless as to which side is operating as the primary side and which is the secondary side, this circuit attempts to equalize the primary and secondary side voltages, and the difference in voltage levels is proportional to the current pulses that flow from the higher to the lower voltage side. Since the high frequency link is time shared by each of the three phases, the algebraic average voltage and current of the high frequency link is zero for a complete sequence of three pulses. This assumes that the frequency ratio is high so that the low frequency three-phase conditions do not change substantially during a three pulse interval, and is based on the fact that in a balanced three-phase system the instantaneous algebraic sum of the voltages, and also of the currents, is zero.

The embodiment of the invention shown in FIG. 5 is a three phase rectifier with a single phase high frequency transformer link. The output characteristic of this circuit is similar to that of a three-phase bridge rectifier using uncontrolled rectifiers such as diodes. The advantage is that voltage transformation is achieved with the use of a small high frequency transformer. The primary side switching circuit, while drawn to look different pictorially, is functionally identical to the primary side switching circuit in FIG. 3. The switching circuit on the other side of the high frequency coupling transformer, however, is a single phase uncontrolled rectifier. Although various configurations of output rectifiers can be used, as for example, the center-tap, doubler, or voltage multiplier configurations, the output rectifier here illustrated is a bridge diode rectifier. The secondary winding 18s of the high frequency coupling transformer is connected across one diagonal of the bridge rectifier comprising diodes 50—53, and a single filter capacitor 54 and a direct current load 55 are connected between the output terminals. The polarity of the unidirectional output voltage is indicated on the diagram.

One method of operating the FIG. 5 three-phase rectifier is to energize the three phases in sequence in exactly the same manner as described for the other embodiments, to result in time sharing the single phase high frequency transformer. Gating circuit 56 thus supplies gating signals to thyristors A1, A2, then to thyristors B1, B2, and then to thyristors C1, C2. As with the FIG. 3 circuit, the phase rotation of firing the complementary pairs of thyristors can be the same as the supply voltage phase rotation or can be counterrotational. Assuming that the algebraic difference between the supply voltage in an energized phase and the voltage at the point 38 on the wye-connected commutating capacitors 35—37 is greater in absolute magnitude than the DC output voltage reflected to the primary transformer winding 18p, one of the thyristors conducts current, and the resulting voltage pulse acting on the secondary winding 18s forward biases diodes 50 and 51 or diodes 52 and 53 depending upon whether the voltage pulse is positive or negative at the dot end of the transformer windings. If the reflected DC voltage is greater than the difference between the supply line voltage and the voltage on the commutating capacitors at point 38 when a particular pair of thyristors are supplied with gating signals, all of the diodes 50—53 will remain reverse-biased. This ordinarily occurs in one phase during a three pulse sequence. In this circuit substantially all of the commutating inductance and capacitance is provided in the primary side switching circuit. Therefore, the duration of the half sinusoidal current pulse produced by the series resonant circuit comprising one of the commutating inductors (L) in series with the wye-connected commutating capacitors (each C) is $\pi\sqrt{L \cdot 3C}$. As before, the series resonant circuit is tuned to a relatively high frequency such as 10 kHz.

FIG. 5 also illustrates the option of programming a fixed delay between the end of one current pulse before the generation of another current pulse. This is indicated in dotted lines as lockout circuit 57. The current is monitored at a convenient point in the primary side circuit, as by the use of a current transformer having a primary winding 58p connected between junction point 17 and one end of primary transformer winding 18p. The current in the secondary current transformer winding 58s is sensed by lockout circuit 57, which operates to inhibit gating circuit 56 for a predetermined time after the current in the circuit falls to zero. An alternative technique even more suitable is to sense the voltage across each pair of inverse-parallel thyristors on the basis that there is no current in the circuit when all of the thyristors are blocking.

Figure 6A:
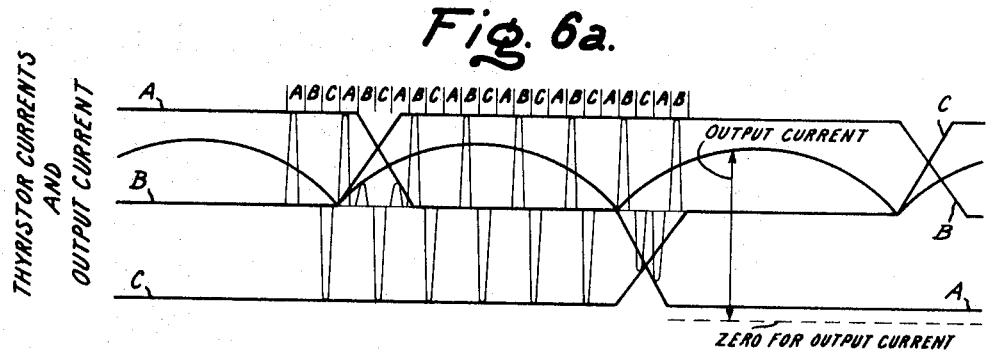
FIGS. 6a and 6b show, respectively, idealized current waveforms of the thyristor currents and output currents, and the envelopes of the thyristor currents, for two different sequences of firing the thyristors in the FIG. 5 polyphase rectifier circuit.
Figure 6B:
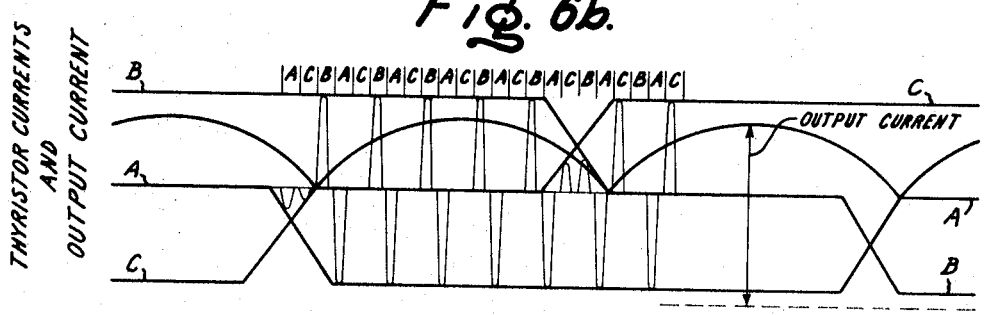

FIGS. 6a and 6b show the thyristor currents, the envelopes of the thyristor currents, and the output current of the rectifier for two different sequences of firing the thyristors. In FIG. 6a the thyristor firing sequence is the same as the supply voltage sequence, namely, ABC. The internal currents are, of course, half sine wave pulses and the envelope of the thyristor currents in each phase is approximately a 120° trapezoid, similar to the trapezoidal currents obtained in a three-phase diode rectifier when there is inductance in the supply lines. The time scale in FIGS. 6a and 6b corresponds to one half-cycle of the supply voltages between the lines 6a–6a and 6b–6b in FIG. 2a. It is apparent in these diagrams that the switches in each phase conduct load pulses for approximately 120° of each half-cycle, and do not conduct load pulses because the diodes are reverse-biased for about 60°. The output current has a ripple of six times the supply frequency and is like the output waveform of a three-phase diode rectifier. During a three pulse sequence, only two of the phases in general conduct current since when the thyristors in the other phase are fired the diodes remain reverse-biased. There is a period of overlap, however, at about the time the supply voltages cross when all three phases are conducting and producing current pulses. This is similar to the overlap of conductance of successive pairs of diodes in a conventional three-phase rectifier due to inductance in the lines. In FIG. 6a there is lagging current from the supply, as can be observed from the fact that the current in each phase do not change polarity until after the corresponding change in polarity of the phase voltage.

FIG. 6b gives the situation for the case of counter phase rotation, that is, the thyristor firing sequence ACB for the supply voltage sequence ABC. These diagrams are similar except that the current from the supply leads the supply voltage. This is unusual in a rectifier circuit since most conventional rectifiers have a lagging current from the supply.

An alternative gating sequence for the FIG. 5 circuit is to gate thyristors A1, B1, and C1 simultaneously, and alternately gate thyristors A2, B2, and C2. With a load that draws a small current, only one thyristor in each high frequency half-cycle conducts, in particular the one among A1, B1, C1 connected to the line having the highest positive voltage or the one among A2, B2, C2 connected to the most negative voltage. The other two of the gated thyristors are reverse-biased. As the amount of load current increases, two thyristors can conduct in each high frequency half cycle. This is because the voltage at point 38 at the junction of the commutating capacitors becomes less positive or negative, as the case may be, so that the thyristor connected to the line with the next highest positive or negative voltage is no longer reverse-biased. When two thyristors in a high frequency half-cycle conduct simultaneously the resonant frequency of the series resonant circuit is changed. Alternate half cycles in general will be unsymmetrical, since the relation of the supply voltages is such that ordinarily there is a "double" current pulse followed by a "single" current pulse. Over a complete low frequency cycle, however, the natural action of the circuit balances the charges passed and the transformer does not saturate. Because of the unequal duration of the current pulses, the gating circuit must be modified or a lockout circuit can be provided as illustrated in FIG. 5 to sense that there is no current in the circuit before firing the next group of thyristors in sequence.

FIG. 7 is a modification of the three-phase rectifier shown in FIG. 5, and illustrates the changes required in the single phase output rectifier in order to supply a unidirectional output voltage of either polarity. In this circuit bridge rectifier diodes 50—53 are replaced by inverse-parallel pairs of thyristors identified as devices D1—D8. When diodes D1—D4 are placed in a condition to conduct current, the output voltage generated is positive at load terminal 60 and negative at load terminal 61. When devices D5—D8 are put into condition to conduct, the polarity of the output voltage is reversed. A synchronous gating circuit 62 is provided to supply gating signals to either one of these two groups of secondary side thyristors, depending on the polarity of output voltage desired, in synchronism with supplying gating signals to the inverse-parallel pairs of thyristors in the primary side circuit in sequence. Alternatively, direct current gating signals can be supplied to the desired set of secondary side thyristors.

The FIG. 7 polyphase rectifier is operable to produce an inverter-type square wave output voltage. To accomplish this, referring to FIG. 7, the voltage on output filter capacitor 54 is reversed by temporarily suspending the normal synchronous gating sequence, and then pulse gating all of thyristor devices D1—D8, following which the normal sequence of synchronous gating is resumed but with devices D1—D8 conditioned to produce the opposite polarity. It is desirable to have some inductance in series with each of the inverse-parallel pairs of thyristors in FIG. 7 to limit the capacitor 54 charge reversal current. A sample sequence of gating for the secondary side thyristors is given in FIG. 8. Thyristors D1—D4 are supplied with a gating signal to produce a positive polarity output voltage for the load 55, then thyristors D1—D8 or at least (D5 or D7) and (D6 or D8) are fired to reverse the polarity of voltage on the output filter capacitor. Thyristors D5—D8 are fired to produce a negative load voltage, and when it is again desired to supply positive load voltage, thyristors D1—D8 or at least (D1 or D3) and (D2 or D4) are again fired simultaneously to again reverse the voltage on filter capacitor 54.

The sequence of firing the thyristors in any of these polyphase power converter circuits, and in particular in the circuit of FIG. 7, can be modified to effect current limiting following the general principles explained in greater detail in U.S. Pat. No. 3,487,289. For this purpose, as is illustrated in FIG. 7 in dotted lines, a current limit gating modifying circuit 63 can optionally be provided to modify the action of synchronous gating circuits 62. The current in the circuit is monitored at a convenient point such as by the use of a current transformer. For instance, a second current transformer secondary winding 58s can be inductively coupled to the primary winding 58p shown in FIG. 5. When the current level rises above a predetermined limit circuit 63 is activated. Referring to FIG. 5, the general principle of this current limiting action is that when the voltage on the commutating capacitors at point 38 exceeds the sum of the DC output voltage and the supply voltage, the normal gating sequence can be interrupted and the opposite member of a previously conducting inverse-parallel pair of thyristors is supplied with a gating signal to render it conductive and return current to the supply, thereby reducing excess commutating capacitor voltage. Assuming that thyristor A1 is conducting, the normal sequence of gating is interrupted and following the current pulse through thyristor A1, thyristor A2 is rendered conductive to return current to the supply. The normal gating sequence is resumed and again interrupted after each normal current pulse so long as the excess current condition exists.

More complex systems (not here illustrated) can be constructed using any of these circuits as a building block. For example, three of the FIG. 3 polyphase transformers can be connected to join two three-phase systems, or source and load. The high frequency links are then operated in a three-phase thyristor firing sequence, to reduce the ripple in the common input and output filter capacitors. The thyristor firing sequence is such that at any given time, current flows from each of the low frequency lines through the high frequency link. Thus, in link 1, phase A is energized; in link 2, phase C is simultaneously energized; while in link 3, phase B is simultaneously energized.

In summary, polyphase power converter circuits capable of producing a variety of transformed output voltage wave shapes are characterized by a single phase high frequency transformer link that is time shared among the phases of a polyphase switching circuit by switching the bidirectional conducting solid state switching devices in sequence at a high switching rate as compared to the frequency of the low frequency polyphase supply. On the secondary side of the transformer the solid state switching devices comprising a similar polyphase switching circuit or a single phase rectifier are switched synchronously with those on the primary side. The reformed output voltage is a polyphase voltage with the same frequency as the supply, or is a unidirectional voltage. Polarity inversion of the output of the single phase rectifier is obtained by interrupting the usual sequence of switching the devices and reversing the voltage of an output filter capacitor.

While the invention has been particularly shown and described with reference to several preferred embodiments thereof, it will be understood by those skilled in the art that the foregoing and other changes in form and details may be made therein without departing from the spirit and scope of the invention.

What I claim as new and desire to secure by Letters Patent of the United States is:

1. A polyphase power converter circuit comprising the combination of
    a single phase high frequency linear transformer having a pair of inductively coupled windings,
    a first polyphase switching circuit including in each phase solid-state switching means effectively connected in series circuit relationship between one of said transformer windings and one of a set of first terminals in which appears a polyphase low frequency electric potential,
    a second switching circuit including a plurality of solid-state switching means each effectively connected in series circuit relationship with the other transformer winding and at least one of a set of second terminals,
    control means for synchronously rendering conductive at least one of said solid-state switching means in each switching circuit for a predetermined interval of conduction, and for sequentially rendering conductive at least one of the other solid-state switching means in each switching circuit synchronously for a predetermined interval of conduction, said switching circuits being switched continuously in sequence at a switching rate which is relatively high as compared to the frequency of the polyphase electric potential appearing in said first terminals,
    whereby the polyphase low frequency electric potential is converted to a series of high frequency voltage pulses, transformed, and reformed at the second terminals with the desired waveform.

2. A circuit as defined in claim 1 further including filter capacitor means connected between said second terminals.

3. A circuit as defined in claim 1 wherein said first switching circuit is a three-phase circuit in which said solid-state switching means have bidirectional conducting characteristics and are wye-connected, and further includes
    filter capacitor means connected between said first terminals and other filter capacitor means connected between said second terminals.

4. A circuit as defined in claim 3 wherein said second switching circuit is a three-phase circuit in which said solid-state switching means are wye-connected.

5. A circuit as defined in claim 3 wherein said second switching circuit is in the form of a single phase rectifier.

6. A circuit as defined in claim 3 wherein said first polyphase switching circuit further includes series capacitor commutation means comprising commutating inductor means effectively coupled in series circuit relationship with commutating capacitor means and tuned to series resonance at a frequency greater than said switching rate for developing half sine wave current pulses and respectively commutating said solid-state switching means.

7. A polyphase power converter circuit comprising the combination of
- a single phase high frequency linear transformer having a pair of inductively coupled windings,
- a first polyphase switching circuit including in each phase bidirectional conducting solid state switching means effectively connected in series circuit relationship between one of said transformer windings and one of a plurality of first terminals in which appears a polyphase low frequency electric potential,
- a second switching circuit including a plurality of solid-state switching means each effectively connected in series circuit relationship with the other transformer winding and at least one of a plurality of second terminals,
- control means for continuously rendering conductive in sequence for approximately equal intervals of conduction, when the circuit conditions are appropriate, the solid-state switching means in the phases of said first polyphase switching circuit, and for synchronously rendering conductive at least one of said solid-state switching means in said second switching circuit, said control means operating to switch said switching means at a switching rate which is relatively high as compared to the frequency of the polyphase electric potential appearing in said first terminals,
- whereby the single phase high frequency transformer is time shared among the phases and the low frequency polyphase electric potential is converted to a series of high frequency voltage pulses, transformed, and reformed at the second terminals with the desired waveform.

8. A circuit as defined in claim 7 wherein said second switching circuit is a polyphase circuit with the same number of phases as said first switching circuit and includes in each phase at least one of said solid-state switching means, said second switching circuit solid-state switching means also having bidirectional conducting characteristics, and
- filter capacitor means connected between said second terminals to facilitate reforming of the low frequency polyphase electric potential at said second terminals.

9. A circuit as defined in claim 7 wherein said second switching circuit is a single phase rectifier circuit and said second switching circuit solid-state switching means are unidirectional devices, and
- a filter capacitor connected between said second terminals.

10. A circuit as defined in claim 7 wherein said second switching circuit is a single phase rectifier circuit and said second switching circuit solid-state switching means are bidirectional conducting switching means, and
- a filter capacitor connected between said second terminals.

11. A three-phase power converter circuit comprising the combination of
- a single phase high frequency linear transformer having inductively coupled primary and secondary windings,
- a first three-phase switching circuit including in each phase bidirectional conducting solid-state switching means effectively connected in series circuit relationship between said primary transformer winding and one of a first set of terminals in which appears a three-phase low frequency electric potential,
- a second three-phase switching circuit including in each phase bidirectional conducting solid-state switching means effectively connected in series circuit relationship between said secondary transformer winding and one of a second set of terminals,
- filter capacitor means connected between said second terminals,
- control means for synchronously rendering conductive one of said solid-state switching means in each switching circuit for a predetermined interval of conduction, and for sequentially rendering conductive in sequence for approximately equal intervals of conduction another solid-state switching means in each switching circuit and finally the remaining solid-state switching means in each switching circuit, said control means operating to switch said pairs of switching means sequentially at a switching rate which is relatively high compared to the frequency of the three-phase electric potential appearing in said first terminals,
- whereby the single phase high frequency transformer is time shared among the phases and the low frequency three-phase electric potential is converted to a series of high frequency voltage pulses, transformed, and reformed at the second terminals as a three-phase electric potential.

12. A circuit as defined in claim 11 wherein said first and second switching circuits further include series capacitor commutation means comprising commutating inductor means effectively connected in series circuit relationship with commutating capacitor means and tuned to series resonance at a frequency greater than said switching rate for developing half sine wave current pulses and respectively commutating said solid state switching means.

13. A circuit as defined in claim 11 wherein the phase rotation of sequentially switching said pairs of solid-state switching means is the same as the phase rotation of the low frequency three-phase electric potential in said first terminals.

14. A circuit as defined in claim 11 wherein the phase rotation of sequentially switching said pairs of solid-state switching means is different from the phase rotation of the low frequency three-phase electric potential in said first terminals.

15. A three-phase rectifier circuit comprising the combination of
- a single phase high frequency linear transformer having inductively coupled primary and secondary windings,
- a three-phase switching circuit including in each phase bidirectional conducting solid-state switching means effectively connected in series circuit relationship between said primary transformer winding and one of a first set of terminals in which appears a three-phase low frequency electric potential,
- a single phase rectifier switching circuit including at least a pair of alternately conducting solid-state switching means each effectively connected in series circuit relationship with the secondary transformer winding across a pair of second terminals,
- a filter capacitor connected between said second terminals,
- control means for synchronously rendering conductive at least one of said solid-state switching means in each switching circuit for a predetermined interval of conduction, and for sequentially rendering conductive at least one of the other solid-state switching means in each switching circuit synchronously for a predetermined interval of conduction, said control means operating to switch said switching means continuously in sequence at a switching rate which is relatively high compared to the frequency of the three-phase low frequency electric potential in said first terminals,
- whereby the single phase high frequency transformer is time shared among the three phases and the low frequency three-phase electric potential is converted to a series of high frequency voltage pulses, transformed, and reformed at the second terminals as a unidirectional voltage.

16. A circuit as defined in claim 15 wherein said control means supplies turn-on signals to the solid state switching means in the phases of the three-phase switching circuit in a predetermined sequence and renders them conductive when the circuit conditions are appropriate.

17. A circuit as defined in claim 16 wherein the phase rotation of supplying turn-on signals to said three-phase switching circuit solid-state switching means is the same as the phase rotation of the three-phase low frequency electric potential in said first terminals.

18. A circuit as defined in claim 16 wherein the phase rotation of supplying turn-on signals to said three-phase switching circuit solid-state switching means is counter to the phase rotation of the three-phase low frequency electric potential in said first terminals.

19. A circuit as defined in claim 16 wherein said three-phase switching circuit further includes series capacitor commutation means comprising commutating inductor means effectively connected in series circuit relationship with commutating capacitor means and tuned to series resonance at a frequency greater than said switching rate for developing half sine wave current pulses and commutating said solid-state switching means.